No. 845,193. PATENTED FEB. 26, 1907.
C. H. PELTON.
HAY LOADER.
APPLICATION FILED DEC. 21, 1905.

Witnesses
G. Howard Walmsley
Irvine Miller.

Inventor
Charles H. Pelton,
By H. A. Toulmin,
Attorney

No. 845,193. PATENTED FEB. 26, 1907.
C. H. PELTON.
HAY LOADER.
APPLICATION FILED DEC. 21, 1905.

Witnesses
G Howard Walmsley
Irvine Miller

Inventor
Charles H Pelton
By H. A. Toulmin
Attorney

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

HAY-LOADER.

No. 845,193.  Specification of Letters Patent.  Patented Feb. 26, 1907.

Application filed December 21, 1905. Serial No. 292,694.

*To all whom it may concern:*

Be it known that I, CHARLES H. PELTON, a citizen of the United States, residing at Springfield, in the county of Clark and State of Ohio, have invented certain new and useful Improvements in Hay-Loaders, of which the following is a specification, reference being had therein to the accompanying drawings.

This invention relates to hay-loaders, and more particularly to hay-loaders of that type which employs rakes supported to slide longitudinally at their upper ends, while their lower ends and the rakes proper are caused to move in an elliptical path by reason of the connection to the rake-bars between their upper and lower ends of the cranks of a crank-shaft.

The object of the invention is to provide a construction whereby the extent of the raking action of the rake-fingers as they move forward over the ground and the pressure with which they are forced downward against the ground may be readily regulated and adjusted so that the rakes may merely touch the ground at one point of their path, or may be caused to drag over the ground for a relatively great distance either without any pressure at all or with a maximum pressure, or may be made to have the various intermediate extents of sweep over the ground and of pressure against the ground between the two extremes.

To these and other ends my invention consists in certain novel features which I will now proceed to describe and will then particularly point out in the claims.

In the accompanying drawings, Fig. 2 is a side elevation of the same. Fig. 3 is a vertical sectional view taken longitudinally of the machine through one of the crank-bearings and the guide therefor carried by the rake-bar. Fig. 8 is a view similar to Fig. 6, showing the position of the crank, guide, and stop-pin when the parts are arranged as in Fig. 7. Fig. 12 is a view similar to Fig. 6, illustrating the arrangement of the crank, guide, and stop-pin in producing the result illustrated in Fig. 11.

In the said drawings I have shown my invention as applied to a well-known form of hay-loader, although the invention is of course applicable to any loader of the general type hereinbefore specified.

Figure 1:
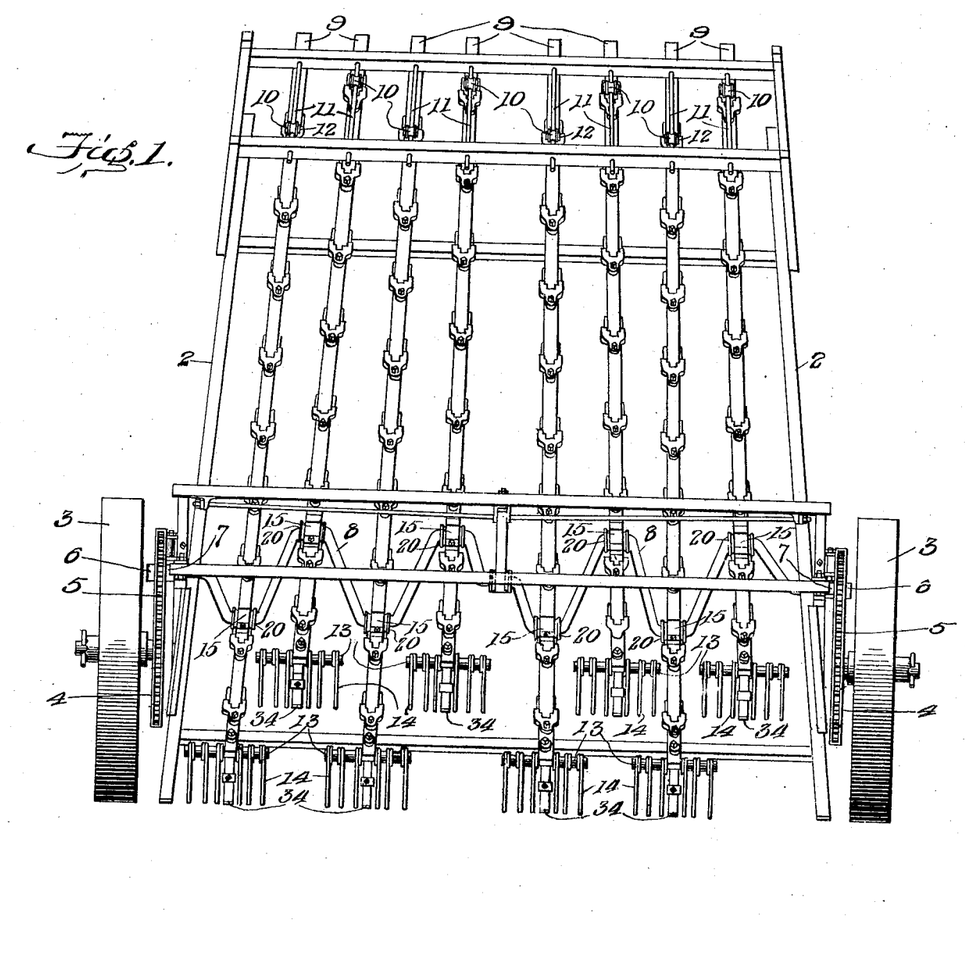
Figure 1 is a rear elevation of a hay-loader embodying my invention in one form.

In the particular loader chosen for purposes of illustration a suitable frame 1, comprising an inclined bed 2, is supported on ground-wheels 3, which by sprocket-gears 4, sprocket-chains 5, and sprocket-gears 6 drive a crank-shaft 7, located above the lower end of the inclined bed, across which it extends transversely. This crank-shaft 7 has oppositely-arranged cranks 8, which operate the rake-bars 9 in the manner hereinafter described. These rake-bars are guided to slide longitudinally at their upper ends in any suitable manner—as, for instance, by guide-rollers 10, traveling on guide-rods 11 and connected to the rake-bars 9 by brackets 12. The cranks 8 being alternately offset on opposite sides of the axis of the crank-shaft 7, the rakes operate alternately in two sets, as is usual in machines of this type. The lower ends of the rake-bars are provided with rake-heads 13, carrying the rake-fingers 14. All of the parts just described may be of any approved construction.

My present invention relates more particularly to the connections between the cranks 8 and rake-bars 9, and since this connection is the same in each instance I will describe the connection between one crank and rake-bar only, it being understood that the same description is equally applicable to all of these connections.

Figures 4, 9, 10:
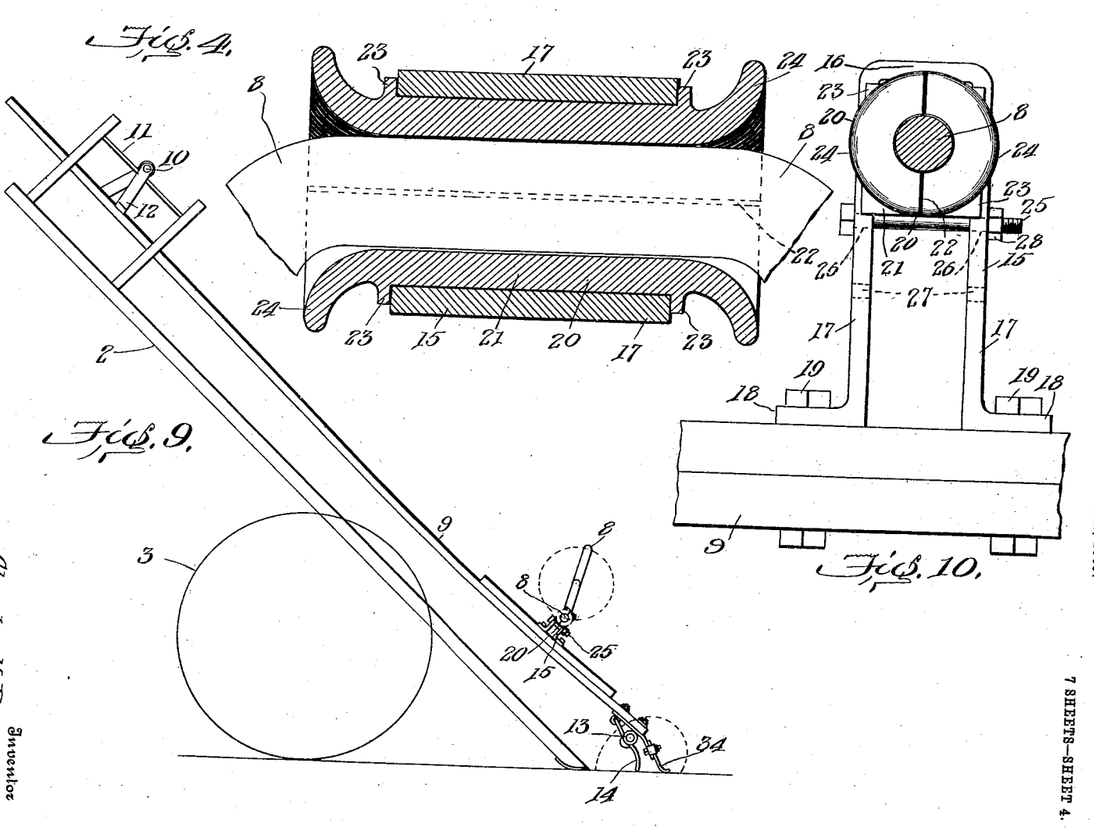
Fig. 4 is an enlarged detail sectional view taken centrally through the crank-shaft in Fig. 3 in a horizontal plane.
Fig. 9 is a view similar to Fig. 5, illustrating the path of the rake-fingers when the crank is held at the upper end of the guide and prevented from sliding therein, the machine being stationary and the crank-shaft revolving.
Fig. 10 is a view similar to Fig. 6, showing the position of the crank, guide, and stop-pin in Fig. 9.

Each bar is provided on its upper side with a guide 15, preferably in the form of a loop, having a top cross-piece 16 and parallel sides 17, arranged at right angles to the bar 9, to which they are connected by lugs 18 and bolts 19 or in any other suitable manner. The crank 8 passes through this guide and may be permitted to either slide longitudinally thereof to the extent of the full length of the guide or of a predetermined portion thereof, or may be locked or held against sliding in the guide in different positions with relation to the guide, thereby obtaining the different raking actions, which will be hereinafter described. Preferably, I employ in connection with the guide and crank a bearing 20, in which the crank rotates and which fits the guide and slides therein when permitted to slide. This bearing is preferably made in two similar parts, as shown in detail in Fig. 15, the body being in the form of a square box 21, divided vertically, as indicated at 22, said square box fitting between the side members 17 of the guide and being provided with terminal flanges 23, which embrace the margins of the side members 17 of the guide and prevent lateral displacement of the bearing. Each bearing is also provided at each end with a flaring mouth 24 to accommodate the adjacent bend of the crank-arm, as illustrated more particularly in Fig. 4.

The means which I prefer to employ for the purpose of controlling the position and extent of movement of the crank relatively to the guide is that shown, consisting of a stop-pin 25, which may be passed through one or the other of a plurality of apertures in the guide in such a way as to effect the desired result. In the present instance I have shown the guide as provided with two sets of alined apertures in its members 17—one set 26 nearer the upper end of the guide and the other set 27 nearer the lower end of the guide. Their number and location may be varied, however, as well as the number of stop-pins employed. The stop-pin is preferably in the form of a bolt threaded to receive a nut 28, by which it may be secured in position after adjustment.

Figures 5, 10, 11:
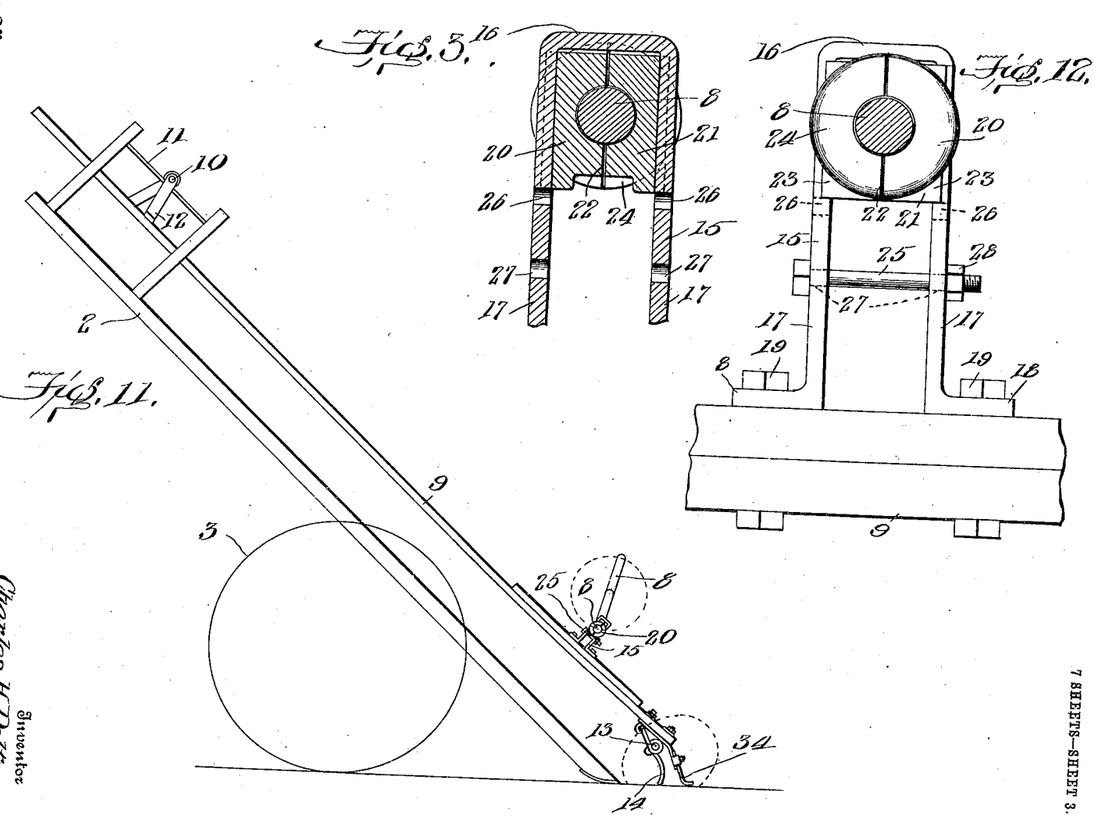
Fig. 5 is an illustrative view in the nature of a side elevation, showing in dotted lines the path of the rake-teeth when the crank-shaft is revolved and the machine is stationary, the crank being free to slide the entire length of the guide.
Fig. 11 is a view similar to Fig. 5, showing the path of the rake-fingers when the crank is permitted to slide in the upper portion of the guide, the machine being stationary and the crank-shaft revolving.
Figures 5, 6:
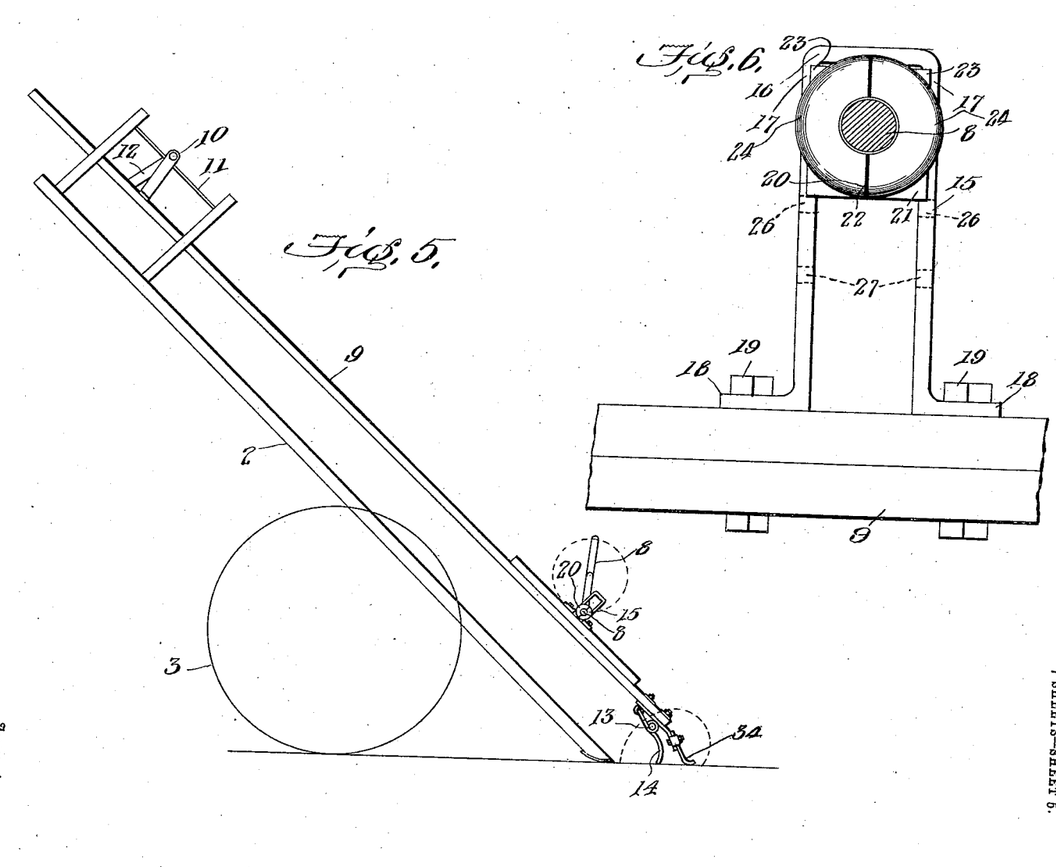
Fig. 6 is an enlarged detail sectional view showing the guide with the stop-pin removed and the crank and guide arranged to produce the movement illustrated in Fig. 5.
Figure 6:
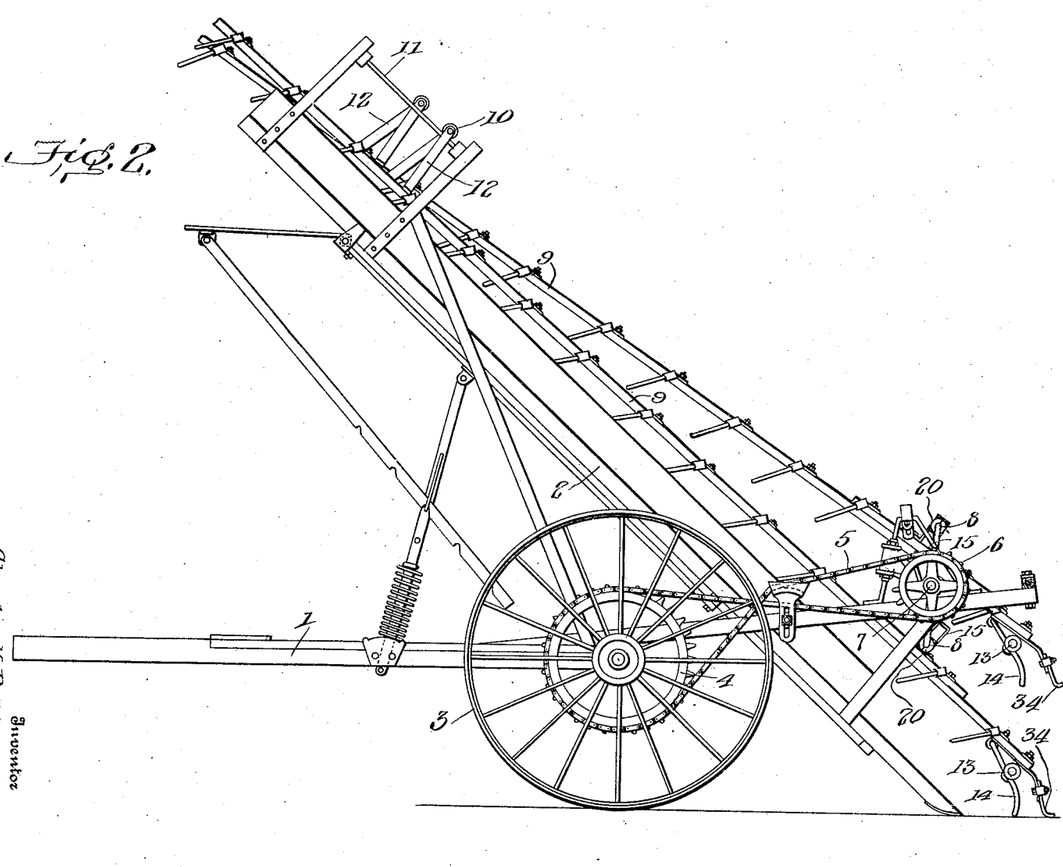

In operating a hay-loader various conditions of the hay as it lies upon the ground are met, the hay being sometimes in the swath and sometimes in windrows, sometimes light, and sometimes heavy. Where the hay is in the swath and light, a long sweep over the ground is required with a comparatively small lift of the rakes during the return movement and with little or no pressure beyond what is given by the weight of the rakes and rake-bars. This condition of affairs is met by arranging the connections between the cranks and rake-bars in the manner shown in Figs. 5 and 6 of the drawings, the stop-pins being removed and the cranks being free to slide the entire length of the guides. The dotted line in Fig. 5 indicates the path taken by the rake-fingers when the parts are thus adjusted, and it will be seen that when the cranks are in their uppermost position, as shown in Fig. 6, the rake-bars are suspended therefrom by means of the top cross-bars 16 of the guide-loops. As the cranks move downward the rake-bars also move downward until the rake-teeth come into contact with the ground, whereupon the cranks continue their downward movement, sliding downward in the guides without exerting any pressure on the rake-bars, and the rakes are drawn forward over the ground with a maximum extent of movement in contact with the same, but with a pressure due only to the weight of the rakes and bars and the attached parts, which is sufficient for light raking in the swath. During the return movement of the rakes the lift is relatively low, since they are suspended from the tops of the guides. Assuming on the other hand, that the hay is in windrow and in heavy masses, requiring considerable downward pressure to prevent the rakes from jumping over the hay, as well as an extended sweep over the ground, the parts are adjusted in the manner shown in Figs. 9 and 10 of the drawings. In other words, the crank is held at the upper end of the guide and prevented from sliding therein by inserting the stop-pin 25 through the upper set of apertures 26, holding the bearing 20 of the crank between said stop-pin and the top cross-piece 16 of the guide. The path traveled by the rake-fingers in this case is indicated by the dotted line in Fig. 9, and it will be seen that said path is practically identical with that illustrated in Fig. 5, the difference in action being that the straight portion at the bottom thereof, indicating the travel of the rake-fingers along the ground, is effected under a maximum pressure, whereas with the arrangement of the parts shown in Fig. 5 there is no pressure at all. If all of the parts were rigid, the rake-fingers would describe a perfect ellipse; but the rake-bars are sufficiently resilient to bend between their upper sliding ends and the point where the guides are secured to them, thus preventing the rake-fingers from being driven into the soil to any material extent and allowing them to follow the path indicated by the dotted line in Fig. 9. This long sweep over the surface of the ground under a maximum pressure insures the gathering up of the hay and its delivery onto the inclined bed of the loader.

Figures 13, 15:
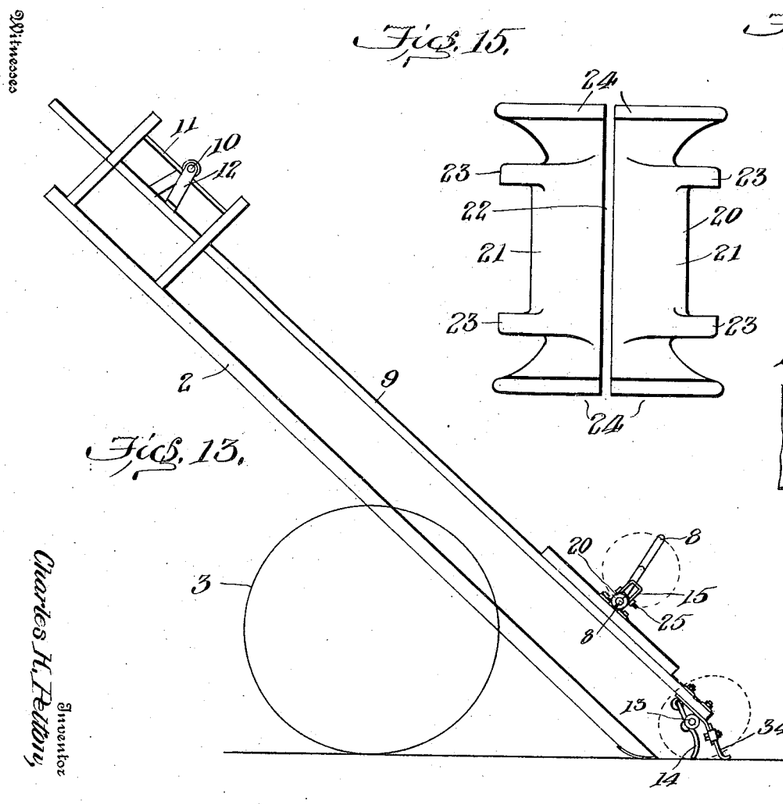
Fig. 13 is a view similar to Fig. 5, illustrating the path of the rake-fingers when the crank is held at the lower end of the guide and prevented from sliding therein, the machine being stationary and the crank-shaft revolving.
Fig. 15 is a detail plan view showing one of the crank-bearings with the two parts thereof slightly separated.
Figure 14:
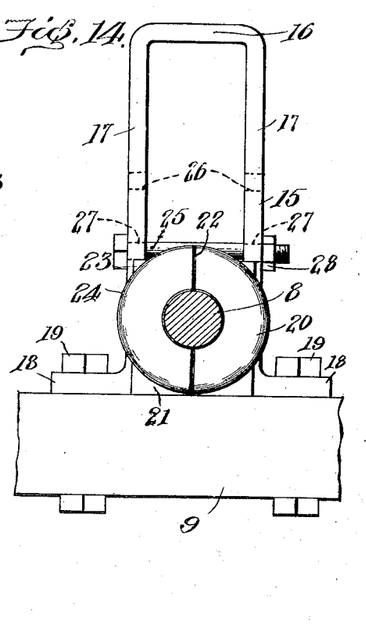
Fig. 14 is a view similar to Fig. 6, illustrating the position of the crank, guide, and stop-pin in producing the movement illustrated in Fig. 13.

Intermediate conditions may be met by different arrangements of the stop-pin. For instance, when the conditions require a relatively light pressure and high lift the arrangement of the parts illustrated in Figs. 7 and 8 may be employed, the stop-pin being placed through the upper apertures 26, but above the crank and its bearing, so that these latter are free to slide to a limited extent in the lower portion of the guide. This results, as shown in dotted lines in Fig. 7, in a somewhat short travel of the rake-fingers over the surface of the ground with a relatively light pressure, due to the mere weight of the rakes. A somewhat longer travel over the ground with a heavier pressure may be obtained by placing the stop-pin through the lower apertures 27, but below the crank and its bearing, as illustrated in Figs. 11 and 12. In this case the crank has a limited sliding motion in the upper portion of the guide. Finally, the crank may be confined to the lower portion of the guide, as illustrated in Figs. 13 and 14, by passing the stop-pin through the lower apertures 27, thereby holding the crank-pin bearing between said stop-pin and the top of the rake-bar. With the parts thus arranged the rakes will only touch the ground at one period of their elliptical path without any extensive dragging action over the same. It will be understood, of course, that by varying the number and position of the apertures and stop-pins almost any desired pressure and range of sweep over the surface of the ground may be obtained.

It will be understood, of course, that the several illustrations showing the path of the rake-teeth are based upon the assumption that the machine is standing still and that the crank-shaft is being rotated. In practice when the machine is being drawn along over the surface of the ground the path would be somewhat different and would be represented by a series of loops, but the relative extent of contact and pressure would remain the same as between the various adjustments illustrated.

Figures 7, 16, 17:
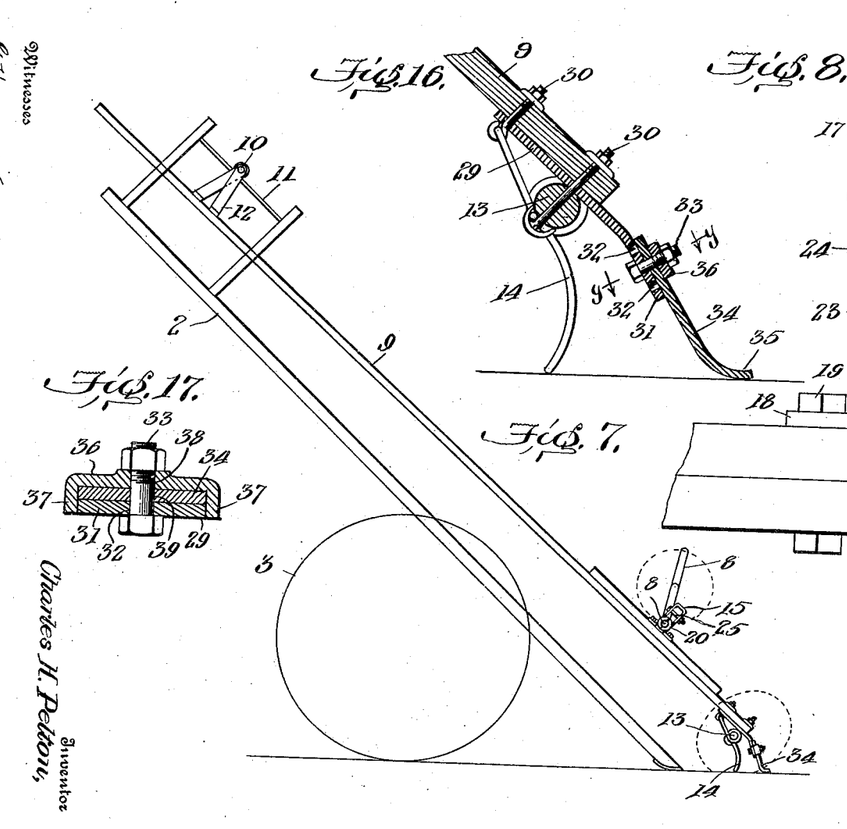
Fig. 7 is a view similar to Fig. 5, illustrating the path of the rake-fingers when the crank is permitted to slide in the lower portion of the guide, the machine being stationary and the crank-shaft revolving.
Fig. 16 is a detail sectional view taken in a vertical plane longitudinally of the machine, illustrating the connection between the protector or gage and the rake-bar.
Fig. 17 is a transverse sectional view taken on a plane corresponding with the plane $y\ y$ of Fig. 16 and looking in the direction of the arrows.

In connection with the rake-bars and rake-fingers I prefer to employ gages or protectors which prevent their being forced to beat into the soil and save them from too severe strains and breakage. In Figs. 16 and 17 I have illustrated the mode of connection of one of these protectors to its rake-bar, it being understood that each rake-bar is provided with a similar device. In this construction, 29 indicates a flat metal bar or strip secured to the under side of the rake-bar 9 at the lower end thereof by means of bolts 30 and extending downward and rearward from said rake-bar at an angle, said extension being indicated at 31. It is provided with apertures 32 to receive a clamping-bolt 33. 34 indicates the protector or gage proper, which is also a flat metal bar, preferably of steel, of the same width as the bar 29, upon which it fits, its lower end being curved rearwardly, as illustrated at 35, so as to trail and have an extended bearing on the surface of the ground, and being resilient. This protector is secured in position on the extension 31 by means of the clamping-bolt 33, aided by a clip or saddle-piece 36, having lateral flanges 37, which extend past and embrace the edges of both of the parts 31 and 34, thereby holding said parts in alinement and preventing the protector from being moved from such alinement. The clamping-bolt 33 passes through an aperture 38 in the saddle-piece or clip 36, an aperture 39 in the part 34, and also through any desired one of the plurality of apertures 32 in the part 31. By reason of this construction the protector may be adjusted so as to extend downward to a greater or less extent below the lower end of the rake-bar, and thereby serve as a gage to regulate the contact of the rake-fingers with the soil. It will thus be seen that the adjustment of these gages is also a factor in determining the actual position of the rake-fingers relatively to the soil when in operation, coöperating in that respect with the means for varying the connections between the cranks and rake-bars.

I do not wish to be understood as limiting myself to the precise details of construction hereinbefore described, and shown in the accompanying drawings, as it is obvious that these details may be varied without departing from the principle of my invention.

Having thus fully described my invention, what I claim as new, and desire to secure by Letters Patent, is—

1. In a hay-loader, a frame, a rake-bar mounted to slide at its upper end relatively to said frame and provided with a rake at its lower end, and a crank-shaft mounted on said frame, in combination with a guide carried by the rake-bar between its ends and engaged by a crank of the crank-shaft, and means adjustably supported on said bar for regulating the sliding movement of said crank within said guide, substantially as described.

2. In a hay-loader, a frame, a plurality of rake-bars mounted to slide at their upper ends relatively to said frame and provided with rakes at their lower ends, and a crank-shaft mounted on said frame and provided with a corresponding plurality of cranks, each rake-bar being provided between its ends with a guide engaged by a crank of the crank-shaft, in combination with means adjustably supported on said bar for regulating the sliding movement of said cranks within said guides, substantially as described.

3. In a hay-loader, a frame, a rake-bar mounted to slide at its upper end relatively to said frame and provided with a rake at its lower end, and a crank-shaft mounted on said frame, in combination with a guide carried by the rake-bar between its ends, a bearing fitting said guide and receiving a crank of the crank-shaft, and adjustable means carried by said guide for regulating the sliding movement of said bearing within said guide, substantially as described.

4. In a hay-loader, a frame, a plurality of rake-bars mounted to slide at their upper ends relatively to said frame and provided with rakes at their lower ends, and a crank-shaft mounted on said frame and provided with a corresponding plurality of cranks, each rake-bar having a guide mounted thereon between its ends, and a bearing fitting said guide and receiving a crank of the crank-shaft, in combination with adjustable means carried by said guide for regulating the sliding movement of said bearing within said guide, substantially as described.

5. In a hay-loader, a frame, a rake-bar mounted to slide at its upper end relatively to said frame and provided with a rake at its lower end, and a crank-shaft mounted on said frame, in combination with a guide carried by the rake-bar between its ends, through which guide a crank of the crank-shaft passes, and a stop-pin adapted to be secured in different positions in said guide to prevent sliding of the crank in the guide, or to limit the extent and location of such sliding movement, substantially as described.

6. In a hay-loader, a frame, a rake-bar mounted to slide at its upper end relatively to said frame and provided with a rake at its lower end, and a crank-shaft mounted on said frame, in combination with a guide carried by the rake-bar between its ends, a bearing fitted to slide in said guide, through which bearing a crank of the crank-shaft passes, and a stop-pin adapted to be secured in different positions in the guide to prevent sliding of the bearing relatively to the guide, or to limit the extent and location of such sliding movement, substantially as described.

7. In a hay-loader, a frame, a plurality of rake-bars mounted to slide at their upper ends relatively to said frame and provided with rakes at their lower ends, and a crank-shaft mounted on said frame and having a corresponding plurality of cranks, each rake-bar having between its ends a guide and a bearing fitted to slide therein, said bearing receiving one of the cranks of the crank-shaft, and a stop-pin adapted to be secured in different positions in the guide to prevent sliding movement of said bearing relatively to the guide, or to limit the extent and location of said sliding movement, substantially as described.

8. In a hay-loader of the character described, the combination, with a crank-shaft and a rake-bar, of a guide-loop secured to the rake-bar and extending upward therefrom, and a bearing fitted to slide in said guide-loop and receiving a crank of the crank-shaft, said loop being provided with apertures near its upper and lower end respectively, and a stop-pin removably fitting said apertures, whereby, when the stop-pin is removed, the bearing is free to slide the entire length of the guide-loop, and whereby, when the stop-pin is inserted in the proper apertures, said bearing may be held stationary either at the top or the bottom of the guide-loop, or may be free to slide either in the upper or lower portion of said guide-loop, substantially as described.

9. In a hay-loader of the character described, the combination, with a crank-shaft, of a rake-bar having a guide-loop thereon, and a bearing to receive a crank of the crank-shaft fitting between the arms of the guide-loop, having lateral flanges to engage the edges of said arms to prevent lateral displacement and having outwardly-flaring flanges beyond said lateral flanges, and divided centrally in a plane parallel with said guide-arms, substantially as described.

10. In a hay-loader, a frame, a rake-bar mounted to slide at its upper end relatively to said frame and provided at its lower end with a rake and with a gage or protector, and a crank-shaft mounted on said frame, in combination with a guide carried by the rake-bar between its ends and engaged by a crank of the crank-shaft, and means adjustably supported on said bar for regulating the sliding movement of said crank within said guide, substantially as described.

11. In a hay-loader, a frame, a rake-bar mounted to slide at its upper end relatively to said frame and provided at its lower end with a rake, and with a protector or gage adjustable to extend to a greater or less extent below said rake-bar, and a crank-shaft mounted on said frame, in combination with a guide carried by the rake-bar between its ends and engaged by a crank of the crank-shaft, and means adjustably supported on said bar for regulating the sliding movement of said crank within said guide, substantially as described.

In testimony whereof I affix my signature in presence of two witnesses.

CHARLES H. PELTON.

Witnesses:
   IRVINE MILLER,
   HARRIET HAMMAKER.